2,805,970

COMBINED CLEANING SOLUTION, PROTECTIVE COATING, AND SOLDERING FLUX COMPOSITION

Byron V. McBride, Irwin, Pa., assignor to Westinghouse Electric Corporation, East Pittsburgh, Pa., a corporation of Pennsylvania No Drawing. Application August 26, 1954,
Serial No. 452,471

7 Claims. (Cl. 148—23)

This invention relates to novel compositions which will function as cleaning solutions, corrosion inhibiting coatings, and soldering fluxes, when applied to metal members.

An object of this invention is to provide a composition which will function to displace moisture and oleaginous matter on a metal member and as a protective corrosion inhibiting coating, which applied coating will also act as a soldering flux during subsequent soldering operations.

A further object of this invention is to provide a metal member with a protective corrosion inhibiting coating which will also function as a soldering flux during subsequent soldering operations, the composition of the applied coating comprising a critical ratio of rosin and a water displacing-oil soluble surface active agent.

Other objects of the invention will, in part, be obvious and will, in part, appear hereinafter.

I have discovered novel compositions comprising from 99.5 to 50 parts by weight of rosin, from 0.5 to 50 parts by weight of a water displacing-oil soluble surface active agent, and a volatile, low viscosity organic solvent for the rosin in an amount to provide from 0.1 to 6 pounds of rosin and surface active agent per gallon of the solvent. Compositions within the above formulation may be employed as cleaning solutions, and to treat metals to provide thereon protective corrosion inhibiting coatings which will also act as soldering fluxes for subsequent soldering operations.

All of the compositions are suitable for use as metal cleaning solutions. When applied to wet and oily metal members, they rapidly and thoroughly displace the moisture and oleaginous matter on the members. The compositions specially adapted for use as cleaning solutions for treating metal members with deep crevices and stranded or laminated members will comprise from 60 to 40 parts by weight of rosin, from 40 to 60 parts by weight of a water displacing-oil soluble surface active agent, and a volatile organic solvent of low viscosity for the rosin in an amount to provide from 0.1 pound to 1 pound of rosin and surface active agent per gallon of the solvent. All of the above compositions may be applied to wet, greasy or oily metal surfaces by a simple dipping or spraying operation and in a few seconds all the moisture and oily matter are removed and a thin film of the composition coats the desired metal. A brief drying leaves a thin film of rosin and surface active agent on the metal surface. This procedure is fast and simple. By comparison the usual conventional method of cleaning wet and oily metal comprises the time consuming and costly steps of (1) dipping in a hot alkaline cleaning solution, (2) rinsing with water, (3) dipping in acid to remove tarnish, (4) rinsing with hot water to remove the acid, and (5) blowing dry with air or passing through a drying oven.

The formulations of compositions of this invention which are particularly suitable to provide corrosion inhibiting coating on metal members, which coatings also function most effectively as a soldering flux during subsequent soldering operations on the member, comprise from 99.5 to 60 parts by weight of rosin, from 0.5 to 40 parts by weight of a water displacing-oil soluble surface active agent, and a volatile organic solvent of low viscosity for the rosin in an amount to provide from 1 pound to 6 pounds of rosin and surface acting agent per gallon of the solvent. For example, metal members which have just had deposited thereon tin plate or have a bright dipped copper surface can be immersed in a solution having the above formulation immediately after the final rinse of the members and while they are still wet. In this manner, the bright clean members are given a protective coating of rosin combined with the surface active agent before oxidation or tarnishing of the surface takes place.

The above novel result is accomplished because the surface tension of the solution of the composition of this invention is lower than the surface tension of the water film on the wet surfaces, and thereby the solution readily displaces the water film. The water displaced from the surface of the members collects into small drops which roll off the surfaces and fall through the coating solution to the bottom of the container holding the solution. The water does not disperse into or contaminate the coating solution. After drying to evaporate the solvent, a corrosion inhibiting coating of rosin associated with the wetting agent is deposited on the surfaces of the metal members. The parts may be stored or put through manufacturing operations for a long period of time without losing their clean, bright condition which they had at the completion of the bright dipping or plating operations.

Any surface active agent which is water insoluble and oil soluble may be used in preparing the compositions of this invention. Numerous surface active agents for this purpose are known. Examples of suitable surface active agents are:

Sorbitan trioleate,
Polyoxyethylene sorbitol laurate having from 3 to 5 oxyethylene groups,
Polyoxyethylene sorbitol oleate-laurate,
Polyoxyethylene sorbitol pentalaurate, and
Alkylated aryl polyether alcohol, such for instance as dodecyl benzene polyether alcohol.

The above compounds may be rendered oil soluble and water insoluble by proportioning the number and length of the side chains in the compound. It is to be understood of course that the terms "oil soluble" and "water insoluble," as used herein, refer to substantial amounts and not to the solubility of traces of either oil or water, as the case may be.

Any volatile organic solvent of low viscosity, or mixtures of two or more, which will dissolve the rosin and surface active agent may be used in preparing the composition of this invention. Examples of suitable solvents are alcohol, toluol, xylol, benzene, acetone naphtha, methyl chloroform, carbon tetrachloride, trichlorethylene, perchlorethylene and methylenechloride.

The following examples are illustrative of the preparation of the compositions of this invention.

*Example I*

A composition having the following formulation was prepared:

Rosin _____ pounds__ 1
Alox 937 (manufactured by Alox Corp., Niagara
  Falls, N. Y.) _____ pounds__ 1
Methyl chloroform _____ gallons__ 10

In preparing the above solution, the rosin was crushed to small particle size. The methyl chloroform was placed in a mixing tank on which there was a cover to prevent evaporation. The crushed rosin and Alox 937 were slowly added with agitation until the rosin and Alox 937 were completely dissolved in the solution.

Alox 937 is a heterogeneous mixture of calcium soaps of high molecular weight organic acids containing small amounts of a surface active agent comprising sulfonated long chain aliphatic alcohols, such as oleyl alcohol.

Example II

A similar composition to Example I was prepared having the following formulation:

| | | |
|---|---|---|
| Rosin | pounds | 9 |
| Alox 937 | do | 1 |
| Methyl chloroform | gallons | 10 |

The above composition was prepared in the same manner as the composition of Example I. Wet and oily copper bus bars and tin plated steel were dipped in the composition of this Example II and were rapidly cleaned in a single dip. The composition left a thin transparent coating on the treated surfaces. Soldering was rapidly and successfully effected on the treated surfaces.

The cleaning solution of Example I was used as a predip for cleaning an assembly of shunt leaves comprising a bundle of thin copper sheets. Moisture and oleaginous matter was removed from the assembly by a simple dip thereof in the solution. After the assembly of shunt leaves had been cleaned, it was immersed in the solution of Example II and dried. There was deposited on the assembly a corrosion inhibiting coating of rosin and surface active agent which functioned weeks later quite effectively as a soldering flux during soldering operations on the shunt leaves. No corrosion occurred on the leaves during the interval between treatment with the solution of Example II and the soldering operations. Excellent soldering results were obtained.

Example III

Compositions were prepared in the same manner as Examples I and II, except that polyoxyethylene sorbitol pentalaurate was substituted in the same amounts for the Alox 937. The same excellent results were obtained as in Examples I and II.

Polyoxyethylene sorbitol pentalaurate is available to the trade as G-1061, manufactured by the Atlas Powder Company, Wilmington, Delaware.

It is intended that all matter contained in the above description shall be interpreted as illustrative and not in a limiting sense.

I claim as my invention:

1. A composition suitable for treating metal members to provide a coating thereupon, the composition composed of from 99.5 to 50 parts by weight of rosin, from 0.5 to 50 parts by weight of a water displacing-oil soluble surface active agent, and a volatile organic solvent of low viscosity for the rosin in an amount to provide from 0.1 pound to 6 pounds of rosin and surface active agent per gallon of the solvent.

2. A composition suitable for treating wet and oily metal members to displace the moisture and oleaginous matter on the members thereby cleaning the members, the composition composed of from 60 to 40 parts by weight of rosin, from 40 to 60 parts by weight of a water displacing-oil soluble surface active agent, and a volatile organic solvent of low viscosity for the rosin in an amount to provide from 0.1 pound to 1 pound of rosin and surface active agent per gallon of the solvent.

3. A composition suitable for treating metal members to provide thereon a corrosion inhibiting coating which also functions as a soldering flux during subsequent soldering operations on the member, the composition composed of from 99.5 to 60 parts by weight of rosin, from 0.5 to 40 parts by weight of a water displacing-oil soluble surface active agent, and a volatile organic solvent of low viscosity for the rosin in an amount to provide from 1 pound to 6 pounds of rosin and surface active agent per gallon of the solvent.

4. A metal member having a coating thereon, the composition of the coating composed of from 99.5 to 50 parts by weight of rosin, and from 0.5 to 50 parts by weight of a water displacing-oil soluble surface active agent.

5. In the method of providing a metal member with a corrosion inhibiting coating which also functions as a soldering flux during subsequent soldering operations on the member, the steps comprising depositing on the member a metal coating from a metal depositing solution, and while the member is still wet, coating the member with a composition composed of from 99.5 to 60 parts by weight of rosin, from 0.5 to 40 parts by weight of a water displacing-oil soluble surface active agent, and a volatile organic solvent of low viscosity for the rosin in an amount to provide from 1 pound to 6 pounds of rosin and surface active agent per gallon of the solvent.

6. In the method of providing a metal member with a corrosion inhibiting coating which also functions as a soldering flux during subsequent soldering operations on the member, the steps comprising cleaning the surface of the member, and coating the member with a composition composed of from 99.5 to 60 parts by weight of rosin, from 0.5 to 40 parts by weight of water displacing-oil soluble surface active agent, and a volatile organic solvent of low viscosity for the rosin in an amount to provide from 1 pound to 6 pounds of rosin and surface active agent per gallon of the solvent.

7. In the method of treating a wet and oily metal member, the steps comprising displacing the moisture and oleaginous matter on the member with a composition composed of from 60 to 40 parts by weight of rosin, from 40 to 60 parts by weight of a water displacing-oil soluble surface active agent, and a volatile organic solvent of low viscosity for the rosin in an amount to provide from 0.1 pound to 1 pound of rosin and surface active agent per gallon of the solvent, and thereafter providing the member with a corrosion inhibiting coating which also functions as a soldering flux during subsequent soldering operations on the member, the composition composed of from 99.5 to 60 parts by weight of rosin, from 0.5 to 40 parts by weight of a water displacing-oil soluble surface active agent, and a volatile organic solvent of low viscosity for the rosin in an amount to provide from 1 pound to 6 pounds of rosin and surface active agent per gallon of the solvent.

References Cited in the file of this patent

UNITED STATES PATENTS

| 2,128,973 | Tisdale | Sept. 6, 1938 |
|---|---|---|

FOREIGN PATENTS

| 61,923 | Switzerland | Nov. 11, 1912 |
|---|---|---|
| 450,949 | France | Jan. 30, 1913 |